United States Patent [19]

Sumii

[11] Patent Number: 5,180,637

[45] Date of Patent: Jan. 19, 1993

[54] DOUBLE-WALLED MICROCAPSULES AND A PROCESS FOR PREPARATION OF SAME

[75] Inventor: Masaaki Sumii, Sakai, Japan

[73] Assignee: Sakura Color Products Corporation, Japan

[21] Appl. No.: 784,521

[22] Filed: Oct. 29, 1991

[30] Foreign Application Priority Data

Nov. 2, 1990 [JP] Japan .................................. 2-298397

[51] Int. Cl.$^5$ .......................... B01J 13/10; B01J 13/18; B01J 13/20
[52] U.S. Cl. ............................... 428/402.21; 264/4.7; 428/402.2; 503/215; 512/4; 430/138
[58] Field of Search ........................ 428/402.21, 402.2; 264/4.7

[56] References Cited

U.S. PATENT DOCUMENTS

| | | | |
|---|---|---|---|
| 3,372,085 | 3/1968 | Westfall et al. | 525/452 |
| 3,864,275 | 2/1975 | Kan et al. | 264/4.7 |
| 4,000,087 | 12/1976 | Maalouf | 428/402.21 |
| 4,223,060 | 9/1980 | Raine et al. | 428/402.2 X |
| 4,228,031 | 10/1980 | Iwasaki et al. | 428/402.2 X |
| 4,396,670 | 8/1983 | Sinclair | 264/4.7 X |
| 4,409,156 | 10/1983 | Hoshi et al. | 264/4.7 X |
| 4,891,172 | 1/1990 | Matsushita et al. | 264/4.7 X |
| 4,977,060 | 12/1990 | Liang et al. | 264/4.7 X |

OTHER PUBLICATIONS

Derwent Abstract, WPl #78-59536A/33 Mitsubishi Paper Mill JP 53079611, A (1978).

*Primary Examiner*—Robert L. Stoll
*Assistant Examiner*—John M. Covert
*Attorney, Agent, or Firm*—Larson and Taylor

[57] ABSTRACT

The invention relates to double-walled microcapsules each having a core of a hydrophobic substance, and a primary wall and a secondary wall formed therearound, the microcapsules being characterized in that the primary wall is composed of an amino resin prepared by polycondensation reaction of at least one member selected from the group consisting of:

(1) urea and formaldehyde,
(2) a methylolurea monomer or a low molecular weight polymer thereof, and
(3) a methylated methylolurea monomer or a low molecular weight polymer thereof, and that the secondary wall is formed from a polyion complex of a cationic polyamide-epihalohydrin resin having a urea bond in the structural unit with a polystyrenesulfonic acid and/or a salt thereof; and a process for preparing the double-walled microcapsules.

4 Claims, No Drawings

DOUBLE-WALLED MICROCAPSULES AND A PROCESS FOR PREPARATION OF SAME

FIELD OF THE INVENTION

The present invention relates to double-walled microcapsules and a process for preparing the same.

BACKGROUND ART

Micro-encapsulation denotes enclosing fine particles or liquid droplets with a film wall to obtain microcapsules having useful characteristics. Frequently unstable substances are micro-encapsulated, and the obtained microcapsules retaining the properties of the substance are used for various applications.

In the fields of recording or display materials, aromas, adhesives and the like, micro-encapsulation was once conducted chiefly by the coacervation method. However, a new micro-encapsulation method was recently proposed in which a film wall of amino resin is formed by in-situ polymerization. Now the new method is predominantly performed because the method uses inexpensive materials, comprises expediently simplified procedures and gives microcapsules of proper strength. Using a specific water-soluble polymer (system modifier), the method is capable of smoothly forming a film wall of the amino resin. Therefore, the method has been variously improved mainly in the selection of system modifiers. For example, improved methods have been proposed as disclosed, e.g., in Japanese Unexamined Patent Publications Nos. 25277/1979, 107881/1979 and 51238/1981.

Yet these conventional film walls of amino resin are hard and brittle and thus likely to develop cracking. Since the development of cracking is accelerated by heat, water or the like, the conventional microcapsules with a film wall of amino resin have the drawbacks of being low in resistance to heat and moisture and tending to ooze out the contents during storage.

Japanese Unexamined Patent Publication No. 170857/1984 discloses a micro-encapsulated toner covered with two walls, namely a primary wall of a resin prepared by addition reaction and/or condensation reaction of a component with a formaldehyde and a secondary wall formed on the primary wall by coacervation of polymer from an organic solution. The micro-encapsulation disclosed in this publication entails complicated steps because of required batchwise formation of the primary and secondary walls and necessitates the formation of the secondary wall in the organic solvent in which the contents are apt to dissolve out during the formation thereof or to have the properties impaired. Further the obtained microcapsules are unsatisfactory in resistance to heat and moisture.

DISCLOSURE OF THE INVENTION

An object of the invention is to provide microcapsules which are excellent in the resistance to heat and moisture.

According to the invention, there are provided: double-walled microcapsules each having a core of a hydrophobic substance, and a primary wall and a secondary wall formed therearound, the microcapsules being characterized in that the primary wall is composed of an amino resin prepared by polycondensation reaction of at least one member selected from the group consisting of:

(1) urea and formaldehyde,
(2) a methylolurea monomer or a low molecular weight polymer thereof, and
(3) a methylated methylolurea monomer or a low molecular weight polymer thereof, and that the secondary wall is formed from a polyion complex of a cationic polyamide-epihalohydrin resin having a urea bond in the structural unit with a polystyrenesulfonic acid and/or a salt thereof; and a process for preparing double-walled microcapsules, comprising the steps of:

emulsifying a hydrophobic substance in water in the presence of at least one of a polystyrenesulfonic acid and a salt thereof as an emulsifier, subjecting to polycondensation at least one member selected from the group consisting of:
(1) urea and formaldehyde,
(2) a methylolurea monomer or a low molecular weight polymer thereof, and
(3) a methylated methylolurea monomer or a low molecular weight polymer thereof
to form a primary wall on the surface of the hydrophobic substance, adding a cationic polyamide-epihalohydrin resin having a urea bond in the structural unit to deposit on the primary wall a polyion complex of the emulsifier with the cationic resin, and subjecting the deposited complex to heat curing reaction to form a secondary wall.

Our research revealed the following. The double-walled microcapsules are pronouncedly high in the resistance to heat and moisture, the microcapsules having a primary wall of amino resin prepared by in situ polymerization and a secondary wall formed on the primary wall by coacervation of a polyion complex of at least one of a polystyrenesulfonic acid and a salt thereof with a cationic polyamide-epihalohydrin resin having a urea bond in the structural unit.

The hydrophobic substance serving as the material for the core in the invention can be any of hydrophobic substances insofar as they do not seriously adversely affect the properties of the microcapsules obtained. Useful hydrophobic substances include a wide range of conventional materials for microcapsule cores which materials are substantially insoluble in water at room temperature whether in the form of a liquid or solids. Examples of such substances are water-insoluble liquids such as olive oil, vegetable oil, toluene, xylene, cyclohexanone, methyl stearate, biphenyl chloride, etc., water-insoluble substances of fusible solids such as naphthalene, lauric acid, myristyl alcohol, etc., water-insoluble metal oxides, water-insoluble solids such as activated carbon, pigments, water-insoluble synthetic polymers, glasses, minerals, etc., and water-insoluble substances which have functions by themselves, such as aromas, bactericidal compositions, fertilizers, thermally color-changing compositions, etc.

The primary wall of amino resin in the double-walled microcapsules of the invention is formed by subjecting to polycondensation reaction at least one member selected from the group consisting of:
(1) urea and formaldehyde,
(2) a methylolurea monomer or a low molecular weight polymer thereof, and
(3) a methylated methylolurea monomer or a low molecular weight polymer thereof.

When the urea and formaldehyde in item (1) are used, the molar ratio of the former to the latter is about 1.0:1 to about 4.0:1, preferably about 1.4:1 to about 3.0:1

Useful methylolurea monomers include monomethylolurea, dimethylolurea, etc. Useful methylated methylolurea monomers include methylated monomethylolurea, methylated dimethylolurea, etc. Any of low molecular weight polymers of these monomers are usable without specific limitation insofar as they are soluble in water. Specific examples of such low molecular weight polymers are those available under "Beetle 60" and "Beetle 65" (trademarks, products of American Cyanamide, Co.).

The primary wall according to the invention is so formed as to have a quantity of about 0.1 to about 20 parts by weight, preferably about 0.2 to about 15 parts by weight, per 100 parts by weight of the core. When the quantity is less than 0.1 part by weight, the primary wall unsatisfactorily covers the core, and the secondary wall subsequently formed would fail to achieve the contemplated results. When the quantity is over 20 parts by weight, the system is thickened and gelled and capsule solids are agglomerated during the encapsulation process. Therefore the quantity outside said range is undesirable.

According to the invention, the secondary wall is formed by heat curing reaction of the polyion complex of the cationic polyamide-epihalohydrin resin having a urea bond in the structural unit with at least one of the polystyrenesulfonic acid and a salt thereof.

The polystyrenesulfonic acid or a salt thereof for use in the formation of the secondary wall can also act as an emulsifier for emulsification of hydrophobic substance in water when the primary wall is produced. Useful polystyrenesulfonic acids are those having a number-average molecular weight of about 100,000 to about 6,000,000, preferably about 200,000 to about 2,000,000. Useful salts of polystyrenesulfonic acids are alkali metal salts thereof, such as sodium salts, potassium salts, etc.

The cationic polyamide-epihalohydrin resin having a urea bond in the structural unit can be prepared by the following process. A condensation reaction involving dehydration is effected between a dicarboxylic acid and a condensate of polyalkylenepolyamine with urea as a diamine component, giving a polyaminepolyureapolyamide resin. The obtained polyaminepolyureapolyamide resin is reacted with an epihalohydrin in the aqueous solution. The resin can be prepared under the conditions as disclosed, e.g., in Japanese Examined Patent Publication No. 19872/1969, U.S. Pat. No. 3,372,085, etc. A preferred example of the process is as follows.

Urea and polyalkylenepolyamine are reacted with each other for removal of ammonia in a current of nitrogen at a temperature of about 160° to about 200° C. for about 2 to about 4 hours. A dibasic acid is added to the reaction mixture. The mixture is subjected to dehydration reaction at a temperature of about 160° to about 200° C. for about 2 to about 4 hours (for conversion to a polyamide). The thus obtained product is gradually cooled to about 50° C. at which an epihalohydrin is added to effect a reaction for conversion to a halohydrin. Water is added to give an aqueous solution having a resin concentration of about 20 to about 40%. The pH is adjusted to about 4.5 to about 5.0. Thereafter the reaction is terminated, whereby the desired cationic polyamide-epihalohydrin resin is obtained.

A suitable molar ratio of polyalkylenepolyamine and urea in the cationic polyamide-epihalohydrin resin is about 2:0.5–2.0. A suitable amount of the dicarboxylic acid to be used corresponds, in terms of moles, to about 0.95 to about 1.3 times the total number of moles of polyalkylenepolyamine and urea. A desirable amount of the epihalohydrin used is about 0.5 to 1.5 moles per mole of the amino group in the polyamide resin.

The cationic polyamide-epihalohydrin resin has a molecular weight not specifically limited and can be used if soluble in water. A proper degree of polymerization of the resin is about 3 to about 20.

A suitable cationic polyamide-epihalohydrin resin is prepared, for example, using a diethylenetriamine as the polyalkylenepolyamine, a terephthalic acid as the dibasic acid and an epichlorohydrin as the epihalohydrin. More specifically, such resins include, for example, one described in Example 1 in the specification of Japanese Examined Patent Publication No. 19872/1969. Commercially available resins under "U-RAMIN P 5600" and "U-RAMIN T 1200" (trademarks, products of Mitsui Toatsu Chemicals Inc.), etc. are also suitable for use.

Proper proportions of the polystyrenesulfonic acid and/or a salt thereof and the cationic polyamide-epihalohyrin resin to be used are about 10 to about 1000 parts by weight, preferably about 20 to about 500 parts by weight, of the latter per 100 parts by weight of the former. Use of less than 10 parts by weight fails to cause coacervation, making micro-encapsulation impossible. Use of above 1000 parts by weight brings about excessive degree of coacervation, thereby thickening and gelling the system and agglomerating capsule solids.

In the invention, the secondary wall formed on the primary wall has a quantity of about 0.01 to about 200 parts by weight, preferably about 0.1 to about 100 parts by weight, per 100 parts by weight of the core. Less than 0.01 part by weight of the secondary wall formed results in a deficiency of secondary wall formed, failing to achieve the contemplated results. On the other hand, more than 200 parts by weight of the secondary wall formed represents a need for a large amount of polyion complex which leads to thickening and gelling the system. Therefore the formation of secondary wall in quantity outside said range is undesirable.

The size of a single double-walled microcapsule according to the invention is not specifically limited, and can be suitably adjusted according to a specific application. Usually it is about 1 to about 200 μm in diameter.

The double-walled microcapsules of the invention can be produced by polycondensation of at least one member selected from the group consisting of
(1) urea and formaldehyde,
(2) a methylolurea monomer or a low molecular weight polymer thereof, and
(3) a methylated methylolurea monomer or a low molecular weight polymer thereof
to form the primary wall on the surface of a hydrophobic substance after which there is performed heat curing reaction of a polyion complex of at least one of a polystyrenesulfonic acid and a salt thereof with a cationic polyamide-epihalohydrin resin having a urea bond in the structural unit to form the secondary wall.

The process for preparing the primary wall is not specifically limited, and is suitably conducted under the conditions of conventional in situ polymerization methods. The primary wall can be formed, for example, by the process disclosed in Japanese Unexamined Patent Publication No. 84883/1978. Useful emulsifiers include the foregoing polystyrenesulfonic acid and/or salt thereof and other conventional emulsifiers.

After formation of the primary wall, the secondary wall is produced on the primary wall covering the hydrophobic substance in the solution used for the formation of the primary wall or in a new solution after separating the hydrophobic substance having the primary wall from the solution used for the formation of the primary wall.

The secondary wall is formed by the following process. The hydrophobic substance having the primary wall formed thereon is dispersed in an aqueous solution containing about 0.1 to about 30% by weight, preferably about 1 to about 10% by weight, of polystyrenesulfonic acid and/or a salt thereof. After the cationic polyamide-epihalohydrin resin is added to the obtained dispersion with stirring, liquid droplets are deposited on the primary wall by coacervation of a polyion complex of the resin with the polystyrenesulfonic acid or salt thereof having an anionic electrical charge in the system. The deposited droplets are subjected to heat curing reaction at a temperature of about 60° to about 80° C. for about 2 to about 6 hours, whereby the secondary wall is formed. The amount of the dispersed hydrophobic substance having the primary wall formed thereon is not specifically limited, and is in the range of about 5 to 150 parts by weight, preferably about 30 to about 100 parts by weight, calculated as the hydrophobic substance, per 100 parts by weight of the aqueous solution.

According to the invention, the primary and secondary walls can be continuously formed by the following process by which the desired double-walled microcapsules can be easily produced.

First, the hydrophobic substance as the material for the core is added to an aqueous solution containing about 0.1 to about 30% by weight, preferably about 1 to about 10% by weight, of polystyrenesulfonic acid and/or a salt thereof. The mixture is emulsified with stirring to give an emulsion containing particles which are about 1 to about 50 μm, preferably about 2 to about 20 μm, in the mean particle size. A lesser amount of polystyrenesulfonic acid and/or a salt thereof used leads to objectionally emulsified state which tends to result in microcapsules of low strength with too large a particle size, whereas an excess thereof used thickens and gels the system. Hence use of polystyrenesulfonic acid and/or a salt thereof in proportions outside said range is undesirable. The amount of the hydrophobic substance to be used ranges from about 5 to 150 parts by weight, preferably about 30 to about 100 parts by weight, per 100 parts by weight of the aqueous solution. A deficiency of the hydrophobic substance provides a dispersion with a low concentration of capsule solids, affording a low productivity and tending to agglomerate capsule solids, whereas an excess thereof thickens and gels the system. Therefore use of the hydrophobic substance in proportions outside said range is undesirable.

Subsequently the material(s) for forming the primary wall (at least one of materials described hereinbefore in items (1) to (3)) is added with stirring and the solution is adjusted to a pH of about 2.0 to about 5.0. Then the solution is heated to a temperature of about 50° to about 90° C. to effect polycondensation reaction for about 1 to about 6 hours, whereby the primary wall of amino resin is produced. The amount of the primary wall-forming material(s) to be added to the aqueous solution is in the range of about 2 to about 100 parts by weight, per 100 parts by weight of the hydrophobic substance. The amount of the material(s) can be suitably adjusted according to the kind of the material(s) used to form the above-specified quantity of the primary wall. A less amount of the material(s) used produces an insufficient quantity of primary wall and gives only microcapsules of low strength, whereas an excess of the material(s) thickens and gels the system, hence is undesirable. When urea and formaldehyde are used for forming the primary wall, the amount of urea to be used is preferably about 2 to about 30 parts by weight, more preferably about 5 to about 15 parts by weight, per 100 parts by weight of the material for the core. When a methylolurea monomer, a methylated methylolurea monomer or a low molecular weight polymer of each of monomers is used for the primary wall, the amount of the material to be used is preferably about 3 to about 50 parts by weight, more preferably about 6 to about 30 parts by weight, per 100 parts by weight of the material for the core. The primary wall-forming material(s) may be added prior to emulsification. The foregoing pH adjustment can be effected using sodium hydroxide, sodium carbonate, acetic acid, hydrochloric acid, sulfuric acid or the like.

Then the cationic polyamide-epihalohydrin resin is added with stirring to the above-obtained dispersion containing the hydrophobic substance having the primary wall after which liquid droplets are deposited on the primary wall by coacervation of a polyion complex of the resin with the polystyrenesulfonic acid and/or a salt having an anionic electrical charge in the system. Thereafter the deposited droplets are subjected to heat curing reaction at a temperature of about 60° to about 80° C. for about 2 to about 6 hours, whereby the secondary wall is formed.

According to the invention, the resulting solution is cooled after the formation of the secondary wall, and the microcapsules are collected as by centrifuging, filtration, spray drying or like conventional means. In this way, the double-walled microcapsules having a mean particle size of about 1 to about 200 μm are obtained.

In the double-walled microcapsules of the invention, the cationic polyamideepihalohydrin resin for forming the secondary wall has a significantly high affinity for the urea-type amino resin of the primary wall due to the presence of the urea bond in the structural unit of the cationic resin, so that the obtained primary and secondary walls are uniformly, seamlessly and firmly bonded to each other.

When the polystyrenesulfonic acid and/or a salt thereof is used as the emulsifier, the primary wall can be easily formed and the following phenomena ensue. That is, the dispersion can suitably hold the capsule solids dispersed therein during the formation of secondary wall, and there occurs a pronouncedly smooth coacervation of a polyion complex of the polystyrenesulfonic acid and/or a salt thereof with the cationic polyamide-epihalohydrin resin, whereby liquid droplets are deposited on the primary wall without agglomeration thereof.

Further, according to the invention, the primary and secondary walls can be continuously formed, thereby facilitating production of double-walled microcapsules.

The double-walled microcapsules according to the invention have a far higher resistance to heat and moisture than conventional microcapsules having only the amino acid wall and can retain the same features as the conventional microcapsules with the amino acid walls alone without detriment of the features.

The microcapsules of the present invention are very useful particularly in the applications as recording or display materials, aromas, adhesives, etc.

EXAMPLES

Given below are Examples and Comparison Examples to clarify the features of the present invention in greater detail.

EXAMPLE 1

A 3 g quantity of polystyrenesulfonic acid (number average molecular weight: 500,000) and 6 g of urea were dissolved in 97 g of water by heating at 60° C. To the solution was added 90 g of methyl stearate, and the resulting mixture was stirred for emulsification until the diameter of the droplets of the methyl stearate became about 5 $\mu$m. The pH of the emulsion was 2.0. Thereafter, to the emulsion was added 1 g of a 20% aqueous solution of sodium hydroxide to adjust the pH of the resulting mixture to 3.2. A 15.6 g quantity of a 37% aqueous solution of formaldehyde was added thereto and the mixture obtained was subjected to a polycondensation reaction at 60° C. for 3 hours. In this way, primary walls were formed on the surfaces of the droplets of the emulsified methyl stearate using a urea-formaldehyde resin.

Thereafter, 50 g of water was added and 12 g of a urea bond-containing cationic polyamide-epichlorohydrin resin (a resin having a solids content of 30% and prepared by the process employed in Example 1 set forth in Japanese Examined Patent Publication No. 19872/1969) was added dropwise thereto. A polyion complex of this resin with the polystyrenesulfonic acid was subjected to coacervation and accumulated on the primary walls. The accumulated polyion complex was cured at 60° C. for 3 hours to form secondary walls. Thereafter, the obtained product was cooled to ordinary room temperature, diluted with water and centrifuged to obtain microcapsules. The obtained microcapsules having double walls had an average diameter of 6 $\mu$m.

EXAMPLE 2

A 3 g quantity of polystyrenesulfonic acid (number average molecular weight: 500,000) was dissolved in 97 g of water by heating at 60° C. A 90 g quantity of methyl stearate was added thereto and the resulting mixture was stirred for emulsification until the diameter of the droplets of the emulsified methyl stearate became about 5 $\mu$m. The pH of the emulsion was adjusted to 3.2 using a 20% aqueous solution of sodium hydroxide. Further, a solution of 10 g of dimethylol urea in 90 g of water was added and the resulting mixture was subjected to a polycondensation reaction at 60° C. for 3 hours, whereby primary walls were formed on the surfaces of the droplets of the emulsified methyl stearate. Secondary walls were formed by following the procedure of Example 1, giving microcapsules having double walls. The microcapsules having double walls had an average diameter of 6 $\mu$m.

EXAMPLE 3

A 3 g quantity of polystyrenesulfonic acid (number average molecular weight: 500,000) was dissolved, by heating at 70° C., in 97 g of water. Further, 90 g of methyl stearate was added thereto and the resulting mixture was stirred for emulsification until the diameter of the droplets of the emulsified methyl stearate became about 5 $\mu$m. The emulsion was adjusted to a pH of 3.0 using a 20% aqueous solution of sodium hydroxide. A 20 g quantity of Beetle 65 (trade name of a low molecular weight polymer of methylated methylol urea manufactured by American Cyanamid Co.) was added and the resulting mixture was subjected to a polycondensation reaction at 70° C. for 4 hours, whereby primary walls were formed on the surfaces of the droplets of the emulsified methyl stearate. Secondary walls were formed in the same manner as in Example 1 to produce microcapsules having double walls. The microcapsules having double walls had an average diameter of 7 $\mu$m.

EXAMPLE 4

Primary walls were formed in the same manner as in Example 1. Thereafter, 50 g of water was added and 12 g of "U-RAMIN P5600" (trade name of a cationic polyamide polyurea-epichlorohydrin resin having a solids content of 25% and manufactured by Mitsui Toatsu Chemicals Inc.) was added dropwise thereto. A polyion complex of the above resin and the polystyrenesulfonic acid was subjected to coacervation and accumulated on the primary walls. The accumulated polyion complex was cured at 70° C. for 4 hours to form secondary walls. Thereafter, the product obtained was cooled to ordinary room temperature, diluted with water and centrifuged to obtain microcapsules having double walls which had an average diameter of 6 $\mu$m.

EXAMPLE 5

Microcapsules having double walls were prepared in the same manner as in Example 4 with the exception of using "U-RAMIN T1200" (a cationic polyamidepolyurea-epichlorohydrin resin having a solids content of 30% and manufactured by Mitsui Toatsu Chemicals Inc.) in place of "U-RAMIN P5600". The thus obtained microcapsules having double walls had an average diameter of 6 $\mu$m.

EXAMPLE 6

A 3 g quantity of polystyrenesulfonic acid (number average molecular weight: 500,000) and 6 g of urea were dissolved, by heating at 60° C., in 97 g of water. A 90 g quantity of methyl stearate was added and the resulting mixture was stirred for emulsification until the diameter of the droplets of the emulsified methyl stearate became about 5 $\mu$m. The emulsion was adjusted to a pH of 3.2 using a 20% aqueous solution of sodium hydroxide. A 15.6 g quantity of a 37% aqueous solution of formaldehyde and 10 g of "Beetle 65" were added thereto and the mixture obtained was subjected to a polycondensation reaction at 70° C. for 4 hours, whereby primary walls were formed on the surfaces of the droplets of the emulsified methyl stearate.

Subsequently, 50 g of water was added and 12 g of "U-RAMIN T1200" was added dropwise thereto. A polyion complex of "U-RAMIN T1200" and the polystyrenesulfonic acid was subjected to coacervation and accumulated on the primary walls. The polyion complex accumulated was subjected to curing reaction at 70° C. for 4 hours to form secondary walls. The product obtained was cooled to ordinary room temperature, diluted with water and centrifuged to obtain microcapsules. The thus obtained microcapsules having double walls had an average diameter of 8 $\mu$m.

COMPARISON EXAMPLE 1

Microcapsules (average diameter: 5 $\mu$m) each having only primary wall were prepared by following the procedure of Example 1.

COMPARISON EXAMPLE 2

A 480 g quantity of 37% formalin was mixed with 240 g of urea and the resulting mixture was adjusted to a pH of 8.0 using triethanolamine. The obtained mixture was heated at 70° C. for 1 hour and thereafter 1 l of an ion-exchanged water was added thereto, giving an aqueous solution of urea-formaldehyde initial condensate. A 100 ml quantity of this aqueous solution of the initial condensate was diluted with an ion-exchanged water so that the volume of the diluted solution became 3 l. The thus obtained solution was adjusted to a pH of 5.0 by the addition of 10% citric acid. A 1 kg quantity of methyl stearate was dispersed in the above solution by stirring until the average diameter of the methyl stearate became 8 μm. Thereafter, the mixture obtained was adjusted to a pH of 3.5 by the addition of 10% citric acid with stirring and reacted at 40° to 45° C. for 4 hours. The reaction mixture was rapidly cooled to 5° C. to form microcapsules having primary wall. This water dispersion was filtered by a vacuum filter and allowed to stand in a dryer maintained at 50° C. for 24 hours to obtain capsules with the primary walls of a urea-formaldehyde resin. Using a homomixer, 1 kg portion of the capsules obtained above was dispersed in a solution consisting of 50 g of styrene-dimethylaminoethylmethacrylate (polymerization ratio of 90:10) and 4 l of DMF. While stirring the dispersion by the homomixer, 1 l of an ion-exchanged water was added dropwise at a rate of 10 ml/sec and the styrene-dimethylaminoethylmethacrylate was subjected to coacervation and was precipitated as secondary walls on the primary walls. The dispersion of the precipitate was filtered by a vacuum filter and dried in a dryer maintained at 50° C. for 24 hours to form microcapsules having double walls.

COMPARISON EXAMPLE 3

Microcapsules having double walls were obtained in the same manner as in Example 1 with the exception of using 25 g of "Sumirezresin 613**" (trade name of a low molecular weight polymer of methylated methylolmelamine manufactured by Sumitomo Chemical Co., Ltd.) in place of urea and formaldehyde.

COMPARISON EXAMPLES 4 AND 5

Microcapsules having double walls were prepared in the same manner as in Example 1 with the exception of using 5 g of ethylene-maleic anhydride copolymer (Comparison Example 4) or 5 g of carboxymethylcellulose (Comparison Example 5) in place of polystyrenesulfonic acid. In any of these cases, however, the coacervation of the polyion complex did not proceed smooth, and the precipitation proceeded to an exceeding extent and thus the agglomeration of the capsules markedly occurred in the step of formation of secondary wall, failing to obtain a capsule having a seamless and uniform secondary wall.

COMPARISON EXAMPLE 6

An attempt was made to prepare microcapsules having double walls in the same manner as in Example 1 with the exception of using 7 g of gum arabic in place of polystyrenesulfonic acid. However, the gelation of the reaction system occurred in the step of forming secondary wall, whereby it was impossible to produce the desired microcapsule.

COMPARISON EXAMPLE 7

An attempt was made to prepare microcapsules having double walls in the same manner as in Example 1 with the exception of using 4 g of polyvinyl alcohol in place of polystyrenesulfonic acid. However, primary wall can not be substantially formed and it was impossible to form secondary wall either because the coacervation did not occur.

Durability tests

The microcapsules obtained in Examples 1 to 6 and Comparison Examples 1 to 5 were evaluated for resistance to heat and humidity by the following procedures. Table 1 shows the test results.

Resistance to heat: Microcapsules were allowed to stand in an oven maintained at 160° C. for 20 minutes. Resistance to heat was evaluated in terms of weight maintenance percentage (%) of the microcapsules before and after allowed to stand in the oven.

Resistance to humidity: Microcapsules were allowed to stand in an atmosphere of a temperature of 70° C. and a humidity of 90% for 48 hours. Resistance to humidity was evaluated in terms of weight maintenance percentage (%) of the microcapsules before and after allowed to stand in the atmosphere.

The higher the weight maintenance percentage, the smaller the loss by the exudation of the core material. In this case, microcapsules obtained are outstanding in durability.

TABLE 1

|  | Resistance to heat (%) | Resistance to humidity (%) |
|---|---|---|
| Example 1 | 96.5 | 98.0 |
| Example 2 | 95.1 | 96.2 |
| Example 3 | 95.8 | 94.5 |
| Example 4 | 95.7 | 96.7 |
| Example 5 | 98.3 | 97.9 |
| Example 6 | 98.5 | 98.2 |
| Comp. Ex. 1 | 45.0 | 50.5 |
| Comp. Ex. 2 | 56.3 | 62.7 |
| Comp. Ex. 3 | 47.8 | 57.2 |
| Comp. Ex. 4 | 60.1 | 44.4 |
| Comp. Ex. 5 | 51.0 | 49.6 |

When the microcapsules tested for resistance to heat and humidity were observed with a scanning electron microscope, those of Examples 1 to 6 according to the invention did not exhibit any deformation and change, but those of Comparison Examples 1 to 5 displayed the destruction, cracking or the like of the capsule. Further, the shrinkage and deformation of the capsules of Comparison Examples owing to the exudation of the core material were also found.

EXAMPLE 7

Microcapsules having double walls were produced in the same manner as in Example 1 with the exception of using a thermochromic material of the following composition in place of methyl stearate.

| Thermochromic material | |
|---|---|
| Crystal violet lactone | 2 g |
| Bisphenol A | 4 g |
| Lauric acid | 45 g |
| Myristic acid | 20 g |
| Palmitic acid | 25 g |

The microcapsules obtained were excellent in durability and were satisfactory thermochromic materials which reversibly changed from colorless ones to those assuming a blue color at 30° C.

EXAMPLE 8

Microcapsules having double walls were prepared in the same manner as in Example 1 with the exception of using a perfume of the following composition in place of methyl stearate.

| Perfume | |
| --- | --- |
| Essence of perfume having the smell of roses | 20 g |
| Alkylnaphthalene | 70 g |

The microcapsules obtained were outstanding in resistance to heat and humidity and maintained the fragrance over a prolonged period of time.

I claim:

1. Double-walled microcapsules each having a core of a hydrophobic substance, and a primary wall and a secondary wall formed therearound, the microcapsules being characterized in that the primary wall is composed of an amino resin prepared by polycondensation reaction of at least one member selected from the group consisting of:
   (1) urea and formaldehyde,
   (2) a methylolurea monomer or a low molecular weight polymer thereof, and
   (3) a methylated methylolurea monomer or a low molecular weight polymer thereof,
and that the secondary wall is formed from a polyion complex of a cationic polyamide-epihalohydrin resin having a urea bond in the structural unit with a polystyrenesulfonic acid and/or a salt thereof.

2. Double-walled microcapsules according to claim 1 wherein the quantity of the primary wall is about 0.1 to about 20 parts by weight, and the quantity of the secondary wall is about 0.01 to about 200 parts by weight, respectively per 100 parts by weight of the core.

3. A process for preparing double-walled microcapsules, comprising the steps of:
   emulsifying a hydrophobic substance in water in the presence of at least one of a polystyrenesulfonic acid and a salt thereof as an emulsifier,
   subjecting to polycondensation at least one member selected from the group consisting of:
   (1) urea and formaldehyde,
   (2) a methylolurea monomer or a low molecular weight polymer thereof, and
   (3) a methylated methylolurea monomer or a low molecular weight polymer thereof to form a primary wall on the surface of the hydrophobic substance,
   adding a cationic polyamide-epihalohydrin resin having a urea bond in the structural unit to deposit on the primary wall a polyion complex of the emulsifier with the cationic resin, and
   subjecting the deposited complex to heat curing reaction to form a secondary wall.

4. A process according to claim 3 wherein the cationic polyamide-epihalohydrin resin is added in an amount of about 10 to about 1000 parts by weight per 100 parts by weight of the emulsifier.

* * * * *